June 15, 1965  E. W. SWENSON ETAL  3,189,355
TRUCK SPREADER APPARATUS
Filed Aug. 9, 1963  4 Sheets-Sheet 4

Inventors
Eskil W. Swenson
Charles B. Strang, Jr.
By
McCanna, Morsbach & Pillote
Attorneys 3,189,355
TRUCK SPREADER APPARATUS
Eskil W. Swenson, Cherry Valley, and Charles B. Strang, Jr., Lindenwood, Ill., assignor to Swenson Spreader & Mfg. Co., Lindenwood, Ill., a corporation of Illinois
Filed Aug. 9, 1963, Ser. No. 301,045
15 Claims. (Cl. 275—8)

This invention relates to apparatus for spreading material on roads and the like and particularly to a truck mounted spreader apparatus.

An object of this invention is to provide a spreader apparatus mountable on a dump truck for spreading material from the dump box, and which enables use of the dump truck for hauling and dumping the contents of the box without removing the spreader apparatus from the truck.

Another object of this invention is to provide a spreader apparatus including a broadcast type spreader and a feed mechanism for feeding material to the spreader, and which feed mechanism is arranged to effect positive feeding of a wide range of different materials to the spreader at a selectively adjustable rate and which avoids dispensing of material when the feed mechanism is stopped.

Yet another object of this invention is to provide a spreader apparatus mounted on a dump truck for spreading material from the dump box, and which spreader apparatus is arranged to enable easy removal of foreign articles therefrom which are too large to pass through the spreader.

A further object of this invention is to provide an apparatus for spreading material having a broadcast type spreader which is constructed and arranged to provide an improved spread pattern.

Still another object of this invention is to provide a spreader apparatus mountable on a truck and employing a broadcast type spreader which is operative to spread material selectively to the left, center or right side of the truck.

These, together with other objects and advantages of this invention will be more readily appreciated as the invention becomes better understood by reference to the following detailed description when taken in connection with the accompanying drawings wherein:

Figure 4:
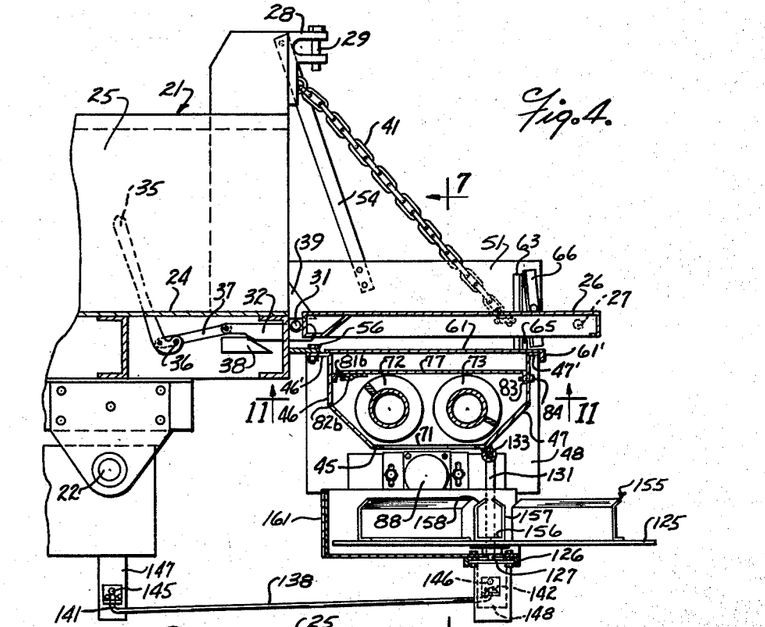
FIGS. 4 and 5 are fragmentary sectional views through the spreader apparatus illustrating the same in different moved positions of the dump box.
Figure 5:
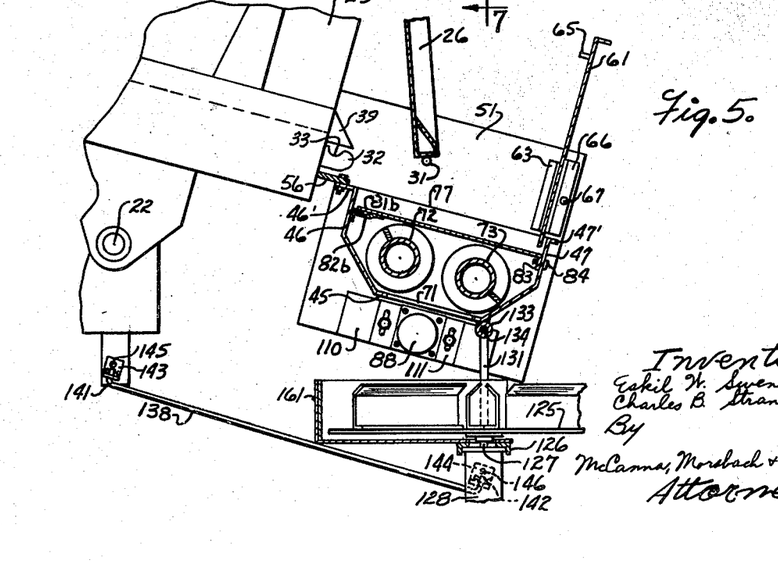

The spreader apparatus of the present invention is generally adapted for use with vehicles having a storage hopper to spread material therefrom. The embodiment of the spreading apparatus illustrated herein, however, is particularly designed for use with a dump truck designated generally by the numeral 20, and which dump truck may be of any conventional construction. The dump truck in general includes a dump box 21 which is mounted on the truck for tilting movement relative thereto about an axis 22 extending crosswise of the truck. A mechanism, including a hoist such as 23 is provided for selectively tilting the box. The box itself includes a bottom wall 24, spaced side walls 25 and an end gate 26 which extends across the rear end of the box. The end gate 26 has trunnions 27 at opposite ends adjacent the upper edges thereof, and which trunnions are adapted to be swingably supported in yokes 28 on the ends of the side walls 25. The trunnions 27 are releasably retained in the yokes 28 as by pins 29. The end gates 26 also includes laterally extending trunnions 31 at opposite ends adjacent the lower edge of the end gate, and mechanism is provided on the dump box engageable with the lower trunnions 31 to provide a releasable pivotal support therefor. One conventional mechanism for supporting the trunnions 31 is somewhat diagrammatically shown in FIGS. 4 and 5 and includes a latch 32 at each side of the dump box having a notch 33 therein for receiving the trunnion 31. The latch 32 is moved into and out of its trunnion engaging position as by a lever 35, herein shown pivotally mounted on a rod 36 extending crosswise of the truck. The lever is connected to the latch, as by a link 37 and is arranged to move the latch from its forward latching position shown in FIG. 4 to a rearward release position. A cam 38 cooperates with the latch to move the latch upwardly as it is moved forward to its clamped position, to thereby clamp the trunnions 31 against a bracket 39 on the box. With the above described arrangement, the upper trunnions can be released to allow the tail gate to swing downwardly about the lower trunnions 31, as shown in FIG. 4, or, alternatively, the lower trunnions 31 can be released to allow the lower portion of the tail gate to swing outwardly about its upper trunnions 27, as shown in FIG. 5. A means such as a chain 41 is conveniently provided for supporting the tail gate when the latter is opened from the top.

The spreader apparatus includes an elongated hopper arranged to extend across the rear end of the dump box to receive material therefrom. An important feature of the present invention resides in the construction and arrangement of the hopper on the dump box so that the material from the dump box can either be discharged into the hopper to be spread by the spreader apparatus or, alternatively, the material from the dump box can be discharged over the top of the hopper to enable dumping of material from the box in the usual manner and without removing the spreader therefrom. The hopper has a generally U-shaped cross section and includes a bottom wall 45 and front and rear walls 46 and 47. The front and rear walls are conveniently angulated at their lower edges, as best shown in FIGS. 4 and 5, but this is not essential. The front and rear walls have flanges 46' and 47' at their upper edges and end plates 48 and 49 which extend across opposite ends of the hopper. The end plates 48 and 49 also have flanges 48' and 49' at their upper edges disposed substantially coplanar with the flanges 46' and 47'. Guide plates 51 and 52 are secured as by welding to the flanges 48' and 49' at opposite ends of the hopper, and which guide plates extend upwardly therefrom.

The hopper is mounted on the dump box for movement as a unit therewith and is positioned with its upper edge disposed at a level below the bottom wall 24 of the dump box sufficient to allow the tail gate 26 to move downwardly at least to a position substantially coplanar with the bottom wall. As shown, the hopper is mounted on the side walls of the dump box by mounting brackets 53 and brace brackets 54 which are secured, as by bolting, to the material guide plates 51 and 52, and to the respective side walls of the dump box. As shown, in FIGS. 4 and 5, the upper edge of the hopper defined by the flanges 46'–49' is disposed at a level below the bottom wall 24 of the hopper sufficient to allow the tail gate 26 to swing downwardly about the lower trunnions 31 to a position at least coplanar with the bottom wall 24 of the dump truck, and preferably slightly beyond that position. A seal strip 56 is attached to the forward flange 46' on the hopper and extends forwardly to engage the rear end of the dump box and prevent discharge of material between the dump box and the forward end of the hopper.

A combination cover plate and back plate 61 is provided for the hopper, and which combination plate is movable between a position shown in FIG. 4 covering the top of the hopper and a position such as shown in FIG. 5 extending upwardly from the rear edge of the hopper to form a back plate to retain the material in the hopper as it is discharged from the dump box. The combination plate 61 is conveniently formed of flat stock and is made sufficiently long to at least partially overlie the flanges 48' and 49' at the ends of the hopper, and sufficiently wide to at least partially overlie the flanges 46' and 47' at the front and rear sides of the hopper, when the plate is in its cover position shown in FIG. 4. A flange 61' is preferably provided along the rear edge of the combination plate to rigidify the same and facilitate handling of the plate when moving it between the positions shown in FIGS. 4 and 5. The ends of the plate are preferably guidably received between the guide plates 51 and 52 to permit sliding of the combination plate into and out of the cover position and the forward corners of the plate are notched at opposite ends as shown at 62 in FIG. 1, to allow the edge of the plate to drop down into the hopper in front of the rear wall 47 thereof when the combination plate is in the position shown in FIG. 5. While various different arrangements may be provided for supporting the plate 61 in the position shown in FIG. 5, this is conveniently achieved by stop flanges 63 attached to each of the guide plates 51 and 52 adjacent the rear wall 47 of the hopper, and which stop flanges are spaced slightly above the top of the hopper to allow the combination plate 61 to slide therebelow. As will be seen from FIG. 4, the lower ends of the stop flanges 63 cooperate with the plate 61 to hold the same down when the plate is in its hopper covering position. The plate 61 is provided with an upwardly projecting lug 65 adjacent the rear end which is arranged to engage the stop flange 63, and clamp members 66, conveniently in the form of angle irons, are provided for engaging the lugs 65 to clamp the same against the stop flanges. The clamp members 66 are removably attached to the guide plates 51 and 52 and, as shown, have a laterally projecting pin 67 which extends through an opening 68 in the respective guide plate. A removable fastener, such as a cotter pin 69, is provided for releasably retaining the clamp members in position. With this arrangement, it will be seen that the clamp members also function to support the plate 61 when the latter is in its upright position shown in FIG. 5. With the above described construction, the combination plate can be readily removed from the upright position shown in FIG. 5 to a hopper covering position, by merely removing the clamp members 66 and dropping the plate 61 down to a position coplanar with the top of the hopper, and thereafter sliding the plate forwardly across the top of the hopper. Moreover, it is apparent that the combination plate can be moved into its hopper covering position even when the space between the hopper and the dump box is filled with material. The forward edge of the cover plate cuts through the material as the combination plate is pushed forwardly over the top of the hopper. Since the top of the hopper is disposed at a level below the bottom of the dump truck, the tail gate 26 can be swung downwardly to the position shown in FIG. 4 to dump material with the tail gate open from the top or, alternatively, the cover can be applied to the hopper and the tail gate opened from the bottom to dump material over the top of the hopper, with the tail gate open from the bottom.

The hopper has a discharge opening 71 in the bottom thereof spaced inwardly from opposite ends of the hopper and a feed mechanism is provided for feeding material lengthwise of the hopper to the discharge opening. While the feed mechanism can be formed of a single auger, it is preferable to employ a pair of augers designated 72 and 73 disposed in side-by-side relation in the hopper. The feed augers are rotatably supported in bearings 74 mounted on the end plates 48 and 49 of the hopper. The augers each have relatively oppositely directed spiral flights designated 72a, 72b and 73a, 73b which extend from the feed openings 71 in the hopper toward relatively opposite ends of the hopper, and which spiral flights are arranged to feed material from opposite ends of the hopper toward the feed opening when the augers are rotated in a preselected direction. In the embodiment shown, the augers 72 and 73 are each rotated in the same direction and the spiral flights 72a and 72b on the auger 72 respectively extend in the same direction as the flights 73a and 73b on the auger 73. Alternatively, the auger could be rotated in relatively opposite directions and the auger flights arranged accordingly so that both augers will feed material toward the discharge opening from opposite ends of the hopper. The use of the dual augers for feeding material to the discharge opening is preferable since it avoids the tendency of the material to bridge across a single auger and, moreover, enables the use of two relatively smaller diameter augers for feeding the same amount of material as could be achieved in a single larger diameter auger, to thereby provide a spreader having a relatively small vertical dimension.

Figure 11:
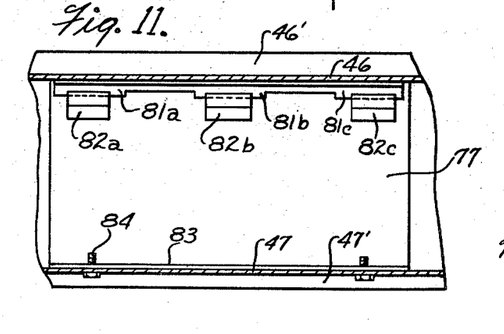
FIG. 11 is a fragmentary sectional view taken on the plane 11—11 of FIG. 4.

A feed plate 77 is provided in the hopper above the discharge opening 71, which feed plate overlies the augers 72 and 73 to achieve more positive feeding of material to the discharge opening when the augers are rotated, and to prevent discharge of material through the discharge opening when the augers are stopped. For this purpose, the feed plate 77 should closely overlie augers at the discharge opening 71 and extend between the front and rear walls 46 and 47 and beyond the ends of the discharge opening 71 a distance sufficient to prevent gravity flow of material from the hopper through the discharge opening. The angle of repose of loose material is approximately 45° and, accordingly, the feed plate should extend beyond the discharge opening a distance approximately equal to the vertical spacing between the plate and the bottom wall 45 of the hopper. The feed plate must be firmly held in position over the augers, but yet must be removable to allow removal of large objects which may become lodged between the augers. One arrangement which has been found very satisfactory for releasably mounting the feed plate on the hopper is best shown in FIGS. 4, 5 and 11. As shown therein, the front wall 46 of the hopper has a notched, generally L-shaped rail secured thereto and which form spaced lugs 81a–81c. The feed plate 77 is arranged to overlie and be supported on the lugs 81a–81c. Spaced keepers 82a–82c are attached to the underside of the feed plate 77 and have an offset portion arranged to underlie the lugs 81a–81c respectively, to prevent lifting of the plate 77. The keepers 82a–82c have a length less than the spacing between the lugs 81a–81c to permit the keepers to pass therebetween. Thus, when assembling the plate on the hopper, it is only necessary to offset the keepers with respect to the lugs to allow the keepers to pass between the lugs, and then slide the plate lengthwise so that the keepers underlie the lugs. A flange 83 is provided at the rear edge of the plate 77 and is detachably secured to the rear wall of the hopper by spaced studs 84.

The augers 72 and 73 are driven from a common motor 88, conveniently of the hydraulic type. In the embodiment illustrated, an improved arrangement is provided for mounting the motor 88, which mounting is best illustrated in FIGS. 7–10. As shown therein, a bearing support plate 91 extends laterally of the hopper, and conveniently, can be formed as an extension of the end plate 48. A pair of self aligning bearings 92 and 93 are mounted on opposite sides of the plate by fasteners 94, and which fasteners preferably extend through slots 95 that are elongated in a direction transverse to a plane through the augers 72 and 73 to permit adjustment of the bearings toward and away from the augers. A shaft 96 is rotatably supported in the self alignment bearings 92 and 93 and extends through an elongated opening 97 in the plate 91. A drive means such as a sprocket 98 is attached to the end of the shaft 96 and is connected through a drive means such as a chain 99 and sprockets 100 and 101 on the augers 72 and 73 respectively. An adjusting screw 104 is threadedly mounted in a lug 105 on the bearing support plate 91 and is adjustable to shift the bearings 92 and 93 relative to the augers to tighten the chain 99.

Figures 6, 8:
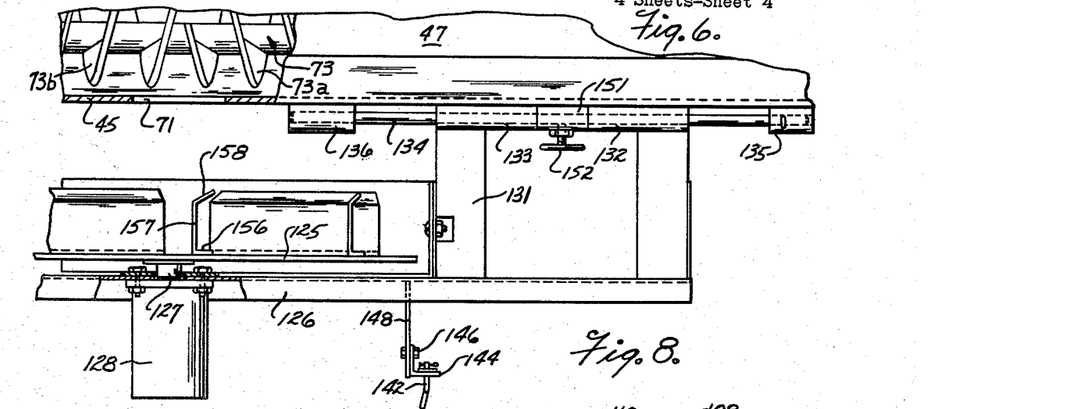
FIG. 6 is a fragmentary rear view of the spreader apparatus, with parts broken away and shown in section to illustrate details of construction.
FIG. 8 is a fragmentary sectional view, taken on the plane 8—8 of FIG. 7.
Figure 7:
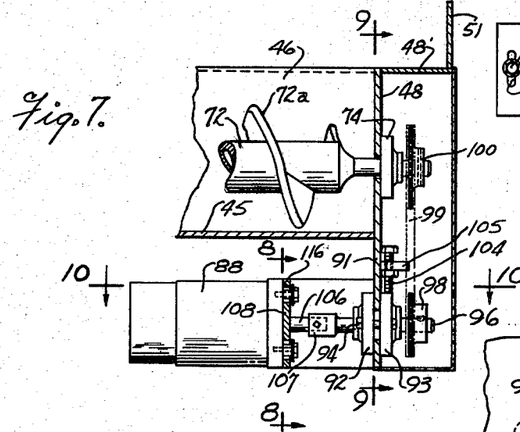
FIG. 7 is a fragmentary vertical sectional view taken on the plane 7—7 of FIG. 4.
Figure 9:
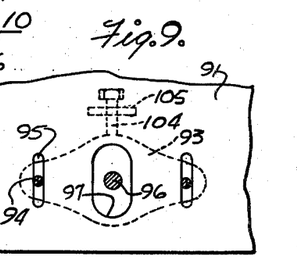
FIG. 9 is a fragmentary sectional view taken on the plane 9—9 of FIG. 7.

The shaft 96 is rigidly connected to the motor shaft 106, as indicated at 107, or may be formed integrally therewith so that the motor will tend to shift with the shaft 96. The motor 88 itself is supported on a motor mounting plate 108, which motor mounting plate is supported by brackets 110 and 111 to extend generally parallel to the bearing support plate 91. As shown in FIG. 8, the motor mounting plate 108 has elongated slots 112 which generally parallel the slots 95 in the bearing support plate and fasteners 113 secure the plate to the brackets 110 and 111 to permit limited adjustment of the motor mounting plate. This permits a rough adjustment of the motor position relative to the position of the bearings 92 and 93. In order to obtain automatic alignment of the motor with the drive shaft 96, the latter is supported for limited floating movement relative to its mounting plate. As also shown in FIG. 8, the mounting plate has enlarged openings 116 and mounting studs 117 having spacers 118 thereon loosely extend through the openings 116 to permit limited shifting of the motor in a direction radially of the shaft. The fasteners 117 have enlarged heads and washers which overlie the inner ends of the openings 116 to prevent axial movement of the motor while permitting the aforementioned radial shifting. The motor mounting plates similarly has an enlarged opening 119 for receiving the shaft 106 and is dimensioned sufficiently large to permit the aforementioned radial shifting movement of the motor. With this arrangement, the motor can automatically shift relative to its mounting plate 108 when the bearings 92 and 93 are adjusted. As will be seen, the fasteners 117 prevent axial movement of the motor and also prevent the motor from turning about its shaft, while yet permitting free radial floating movement of the motor.

A rotary broadcast type spreader is provided for spreading the material as it is fed from the discharge opening 71. The broadcast type spreader includes a spinner 125, herein shown in the form of a disk, and which is mounted on a support bracket 126 for rotation about a generally upright axis 127. The drive mechanism herein shown in the form of an hydraulic motor 128 is provided for rotating the spinner. As best shown in FIGS. 4 and 5, the spinner 125 is mounted on the hopper so that the discharge opening in the hopper 71 overlies only the forward portion of the spinner whereby the material is discharged onto the spinner substantially at the front of the center thereof. An improved arrangement is provided for mounting the spinner on the hopper to maintain the spinner substantially horizontal, as the dump box and hopper are tilted, and to also permit shifting of the spread pattern of the spinner selectively to the left, center or to the right of the truck, as desired. For this purpose, the bracket 126 is provided with upwardly extending arms 131 having spaced sleeves 132 and 133 at their upper ends. The sleeves 132 and 133 are slidably and rotatably supported on a rod 134 which is attached by preferably tubular brackets 135 and 136 to the hopper. The bracket 126 and spinner 125 are therefore free to swing about a generally horizontal axis, and a link 138 is connected to the broadcast spreader and to the truck to maintain the spinner axis generally upright as the dump box and hopper are tilted. As best shown in FIGS. 4 and 5, the link 138 has laterally projecting trunnions 141 and 142 at opposite ends, which trunnions are swivelly attached to generally L-shaped brackets 143 and 144, and which brackets are in turn mounted for pivotal movement by fasteners 145 and 126 on brackets 147 and 148, respectively attached to the truck frame and to the spinner support frame 26. As will be seen, the link 138 forms a parallelogram type linkage with the dump box and hopper, and which parallelogram linkage has joints at the dump box axis 22, spinner support rod 134, and fasteners 145 and 146. In addition, it will be noted that the link 138 is also pivotal relative to the brackets 143 and 144 about axis perpendicular to the link.

Figures 1, 10:
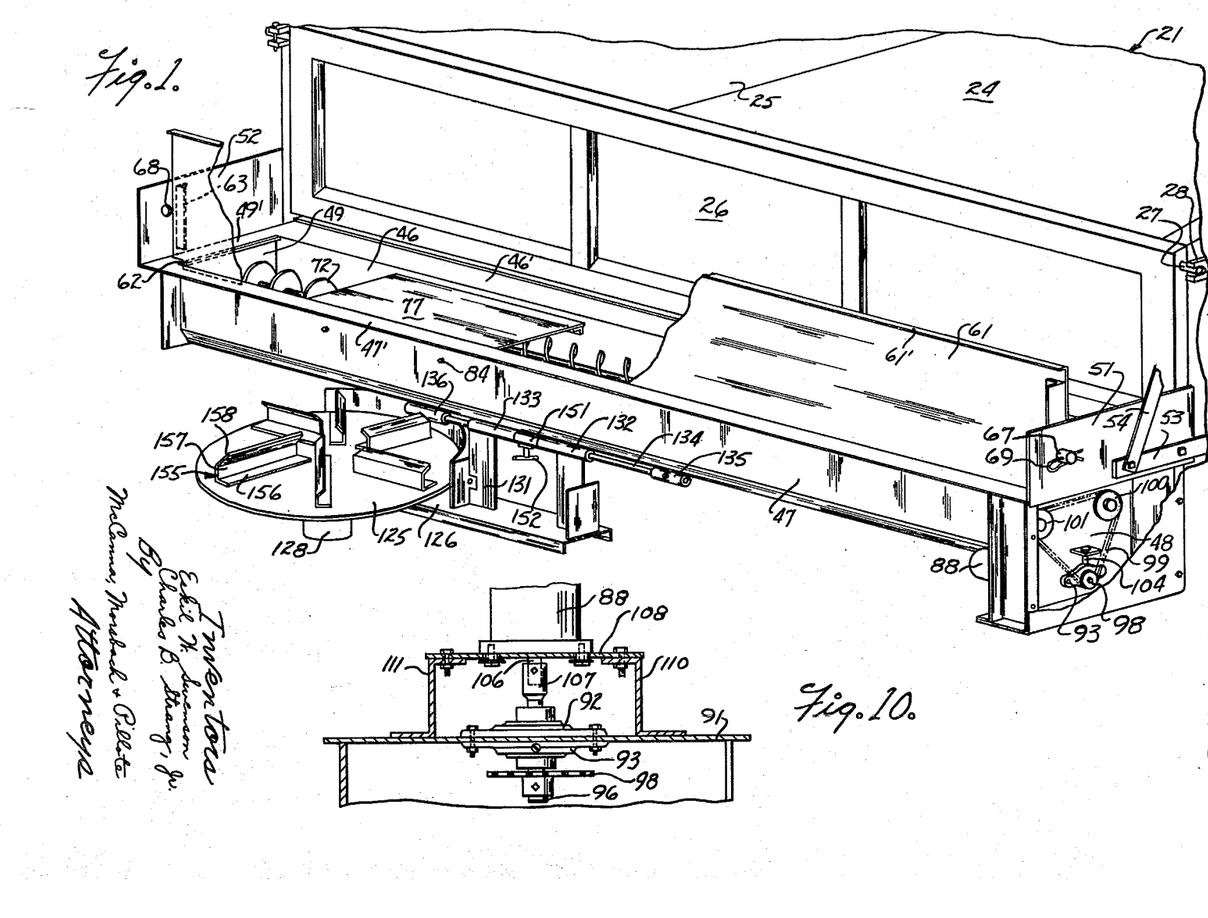
FIG. 1 is a fragmentary perspective view of a truck having the spreader apparatus mounted thereon, and with parts of the spreader apparatus broken away to illustrate details of construction.
FIG. 10 is a fragmentary sectional view taken on the plane 10—10 of FIG. 7.
Figure 2:
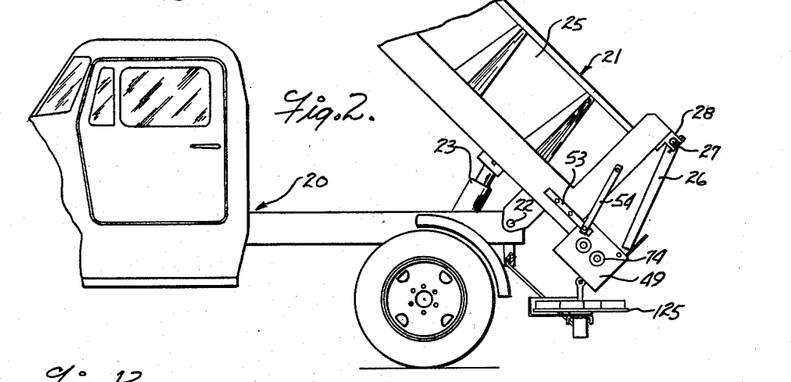
FIG. 2 is a fragmentary side elevational view of a truck having the spreader apparatus mounted thereon.
Figure 3:
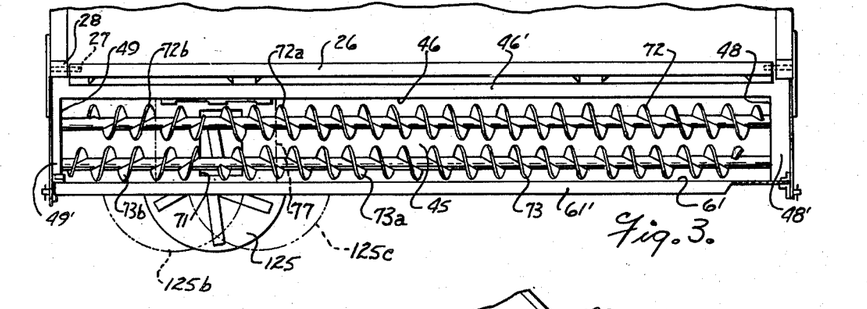
FIG. 3 is a top plan view of the spreader apparatus shown mounted on the rear of the truck.
Figure 12:
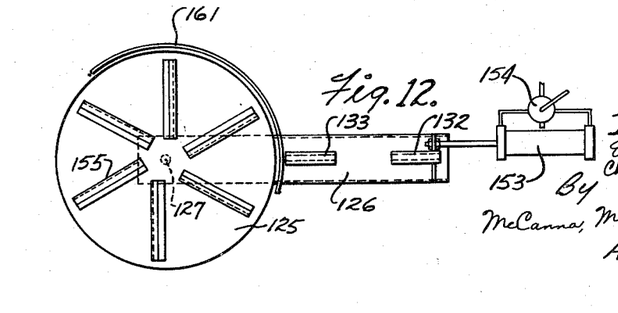
FIG. 12 is a top plan view of the broadcast type spreader and mounting bracket therefor.

As previously noted, the spinner 125 is positioned so that the material from the discharge openings 71 is dispensed substantially to the front of the center line of the disk. It has been found that the spread pattern from the spinner can be shifted markedly to spread material at the left of the truck, at the center of the truck and also at the right side of the truck, by shifting the spinner axis in a direction crosswise of the truck. As shown in FIG. 1, the sleeve 132 and 133 are slidable along the rod 134 to enable shifting of the spinner relative to the hopper in a direction crosswise of the truck, and a locking sleeve 151 having a locking screw 152, is disposed between the sleeves 132 and 133 to enable manual shifting and locking of the spinner in an adjusted position. Alternatively, a mechanical or hydraulic remote control apparatus may be provided for shifting the spinner crosswise of the truck from a remote position such as at or in the truck cab. As diagrammatically shown in FIG. 12, a linear hydraulic actuator such as a cylinder and piston, is operatively connected to the spinner bracket 126 to shift the same under the control of a valve 154 conveniently located in the truck cab. The cylinder of the linear actuator is mounted on a stationary post of the spreader, such as the hopper and the piston rod is connected to the spinner support bracket to shift the same as the piston is extended and retracted. Thus, the spinner is movable from a center position in which its axis is centered in a direction crosswise of the vehicle below the discharge opening, as shown in solid lines in FIG. 3, to a position in which the spinner axis is offset to the left of the discharge opening, as indicated at 125b in FIG. 3, and to a position to the right of the discharge opening as indicated at 125c. When the spinner is moved to the left of the discharge opening, that is the position such as indicated at 125b, the material deposited on the spinner is spread largely toward the left hand side of the truck and, when the spinner is moved to the right position shown at 125c, more of the material is spread at the right side of the truck. With this arrangement, the truck can proceed down the right hand lane and spread material on the left lane of the highway and vice versa. In addition, it can proceed down the center and spread equally at both sides of the truck.

The spinner 125 has a plurality of vanes extending upwardly therefrom, herein shown six in number and designated by the numeral 155. In order to provide a relatively flat spread pattern and avoid throwing material high into the air, the vanes are preferably shaped as best shown in FIGS. 4 and 5 and include an attaching portion 156 secured to the disk 125, and upwardly extending leg 157 and an upwardly and forwardly extending portion 158 on the upper end of the leg 157. The upwardly and forwardly inclined portion 158 functions to confine the material to a generally flat spread and avoids throwing the material high into the air. Improved control over the direction of spread of material from the spinner is achieved by positioning the vanes on the spinner in the manner best shown in FIG. 12. In general, the vanes 155 are mounted on the spinner so that the upright legs 157 are spaced laterally from a radial line through the center of the spinner in a direction opposite the direction of rotation of the spinner. For example, on a spinner having a nine inch radius, the vanes are preferably offset from a radial line through the spinner axis in a direction opposite the direction of rotation, approximately 1¼ inches. With this arrangement, the vanes are skewed in a manner to aid in preventing premature discharge of material from the spinner. A small shroud 161 is preferably provided to extend around the front side of the spinner, to prevent discharge of material at that side.

Figure 13:
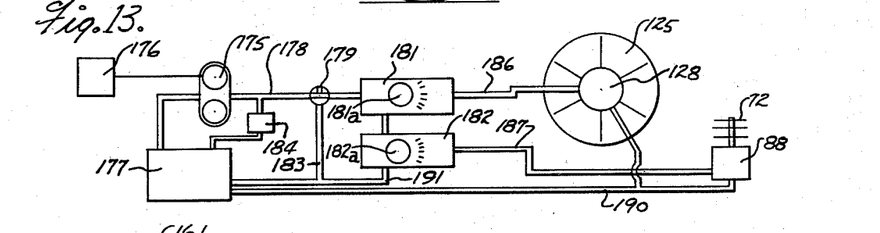
FIG. 13 is a diagrammatic view illustrating the hydraulic system for the spreader apparatus.

An hydraulic control system for the spreader apparatus is diagrammatically illustrated in FIG. 13. This control system can conveniently be of the type disclosed and claimed in the copending application of Eskil W. Swenson and Burl Wilder for "Truck With Hydraulic Spreader Apparatus," Serial No. 146,921 filed October 23, 1961, now Patent No. 3,113,784, and assigned to the assignee of the present invention. In general, the hydraulic system includes a pump 175 which is driven by a motor 176 that may be either the truck motor or an auxiliary motor. The pump withdraws fluid from a reservoir 177 and delivers the fluid under pressure to a delivery line 178. A three-way valve 179 is provided in the line 178 for directing fluid either to the control valves 181, 182 or back through a return line 183 to the reservoir. A relief valve 184 may be provided between the outlet side of the pump and the reservoir to prevent the build up of excessive pressure in the system. The control valves 181 and 182 are preferably of the pressure compensated flow control type disclosed in the aforementioned application and which operate in response to the pressure drop across an adjustable orifice to maintain a constant flow rate determined by the setting of the orifice. Valve 181 controls the flow of fluid through a conduit 186 to the spinner motor 128 and the fluid by-passed by the valve 181 is directed to the valve 182 which controls the flow through conduit 187 to the auger drive motor 88. The spinner and auger motors 128 and 88 have return lines 190 and the valve 182 is similarly connected through a return line 191 to the reservoir. Valves 179, 181 and 182 can conveniently be located in the truck cab to enable selective control of the spreader from the cab. The three-way valve 179 is normally positioned to by-pass the pump discharge through conduit 183 to the reservoir and, during operation, is moved to a position to direct the pump discharge to the valve 181. Valves 181 and 182 can be individually adjusted to independently control the speed of the spinner and the auger to vary the amount of material and the width of the spread. With the pressure compensated flow control valves, the valves will maintain the preset flow to the spinners and augers determined by the setting of the valves and independent of the speed of the truck or drive motor.

From the foregoing, it is thought that the construction and operation of the spreader apparatus will be readily understood. The hopper is mounted directly on the dump box for tilting movement therewith and is positioned below the level of the bottom of the dump box so that the tail gate can be opened at the top as shown in FIG. 4 or at the bottom as shown in FIG. 5. The combination cover and back plate 61 can be positioned as shown in FIG. 4 to cover the hopper and permit discharge of material thereover so that the dump truck can be used for hauling and dumping material even while the spreader is attached. When it is desired to spread material, the cover plate 61 is drawn rearwardly and then swung upwardly to the position shown in FIG. 5 and locked in this position by the clamp members 66. When arranged in this manner, the plate prevents discharge of material over the rear side of the hopper, even when the dump box is tilted to its extreme limit.

The feed augers having oppositely directed flights positively feed material from both ends of the hopper and under the feed plate 77 to the discharge opening 71. Since the feed plate closely overlies the augers at the discharge opening, the material being advanced by the augers from opposite directions cannot pass upwardly and is therefore forced downwardly through the discharge opening 71. This assures positive feeding of a wide variety of materials including fine and coarse granular materials such as gravel, sand and chemical materials, and also wet sand, gravel with clay and the like. Moreover, since the cover plate overlies the discharge opening, it prevents the discharge of loose materials when the auger is stopped.

The spinner spreads the material as it is discharged from the hopper and, by shifting the spinner in a direction crosswise of the vehicle, to the left and to the right it is possible to change the spread pattern to direct the material respectively to the left or to the right of the truck, if desired.

We claim:

1. In combination with a dump truck having a dump box mounted thereon for tilting movement about an axis extending crosswise of the front-to-rear centerline of the truck, said dump box having a bottom and being open at the rear end to permit discharge of material therefrom, a spreader including an elongated hopper mounted to extend along the rear end of the dump box and having front and rear walls and an open top with the upper edges of the front and rear walls disposed at a level no higher than the bottom of the dump box, and a combination hopper cover and back plate dimensioned to extend completely across the top of the hopper between the front and rear walls of the hopper to cover the same and allow material in the dump box to be discharged over the top of the hopper, said combination plate being movable from a first position extending across the open top of the hopper to a second position extending upwardly from the open top of the hopper adjacent the rear wall thereof, and means on said hopper for releasably supporting said combination plate thereon in said second position to guide material from the dump box into the hopper, and means for spreading material from said hopper.

2. In combination with a dump truck having a dump box mounted thereon for tilting movement about an axis extending crosswise of the front-to-rear centerline of the truck, said dump box having a bottom and being open at the rear to permit discharge of material therefrom when the box is tilted, the improvement comprising a spreader including an elongated hopper rigidly mounted on the box for tilting movement as a unit therewith, said hopper extending along the rear end of the dump box and having front and rear walls with the upper edges of the front and rear walls disposed at a level below the bottom of the dump box, and a combination hopper cover and back plate dimensioned to extend completely across the top of the hopper between the front and rear walls of the hopper to cover the same and allow material in the dump box to be discharged over the top of the hopper, said combination plate being movable from a first position extending across the open top of the hopper to a second position extending upwardly from the open top of the hopper adjacent the rear wall thereof, and means on said hopper for releasably supporting said combination plate thereon in said second position to guide material from the dump box into the hopper, and means for spreading material from the hopper.

3. The combination of claim 2 wherein said combination plate is slidable in the plane of the upper edges of said front and rear walls across the top of said hopper to cut off material flowing into the hopper.

4. In combination with a dump truck having a dump box mounted thereon for tilting movement about an axis extending crosswise of the front-to-rear centerline of the truck, said dump box having a bottom and being open at the rear to permit discharge of material therefrom when the box is tilted, the improvement comprising a spreader including an elongated hopper rigidly mounted on the box for tilting movement as a unit therewith, said hopper extending along the rear end of the dump box and having front and rear walls with the upper edges of the front and rear walls disposed at a level below the bottom of the dump box, said hopper having end plates disposed outwardly of the open rear end of said dump box and extending above the level of the upper edges of said front and rear walls of the hopper, a combination cover and back plate having a width to span space between the front and rear walls of the hopper and a length to be received between said end plates on the hopper, said combination plate being slidable across the top of the hopper to a first position covering the top of the hopper, said combination plate being movable to a second position extending upwardly from the hopper adjacent the rear wall thereof, and means for releasably securing said combination plate in said second position thereof to said end plates.

5. In combination with a dump truck having a dump box mounted thereon for tilting movement about an axis extending crosswise of the front-to-rear centerline of the truck, said dump box having a bottom and being open at the rear to permit discharge of material therefrom when the box is tilted, the improvement comprising a spreader including an elongated hopper rigidly mounted on the box for tilting movement as a unit therewith, said hopper extending along the rear end of the dump box and having front and rear walls with the upper edges of the front and rear walls disposed at a level below the bottom of the dump box, said hopper having end plates disposed outwardly of the open rear end of said dump box and extending above the level of the upper edges of said front and rear walls of the hopper, a combination cover and back plate having a width to span space between the front and rear walls of the hopper and a length to be received between said end plates on the hopper, said end plates having stop flanges on the registering faces thereof extending upwardly from adjacent the rear wall of the hopper, said combination plate being slidable across the top of the hopper below said stop flanges to a first position covering the top of the hopper, a lug on each end of said cover plate engageable with a respective stop flange when the combination plate is in said first position, said combination plate being movable to a second position extending upwardly from the hopper adjacent said rear wall and abutting said stop flanges, and means attached to said end plates and engageable with said lugs when the combination plate is in said first position and engageable with said combination plate when the latter is in said second position for clamping the same to said stop flanges.

6. In combination with a dump truck having a dump box mounted thereon for tilting movement about an axis extending crosswise of the front-to-rear centerline of the truck, said dump box having a bottom and being open at the rear to permit discharge of material therefrom, a tail gate on the box extending across the rear end thereof and having means swingably supporting the same on the box for horizontal swinging selectively about the upper edge of the tail gate or about the lower edge of the tail gate, the improvement comprising a spreader including an elongated hopper rigidly mounted on said box for tilting movement therewith, said hopper extending along the rear end of the dump box and having front and rear walls with the upper edges of the front walls disposed at a level sufficiently below the bottom of the dump box to permit said tail gate to swing about the lower edge thereof to a position substantially level with the bottom of the dump box and overlying the hopper, and a combination hopper cover and back plate dimensioned to span the space between said front and rear walls along the length of the hopper, said combination plate being movable from a first position covering the top of the hopper to a second position extending upwardly from the hopper adjacent the rear wall thereof, and means for releasably latching said combination plate in said first and second positions on said hopper.

7. A truck spreader apparatus comprising an elongated hopper having a generally U-shaped cross-section, means for mounting the hopper on a dump truck, said hopper having front and rear walls and a bottom wall and a discharge opening in said bottom wall intermediate the ends of the hopper, at least one feed auger mounted in said hopper for rotation about an axis lengthwise of the hopper, said feed auger having oppositely directed spiral flights thereon extending from the discharge opening toward opposite ends of the hopper for feeding material lengthwise of the hopper from relatively opposite directions toward said discharge opening when the auger is rotated in one direction, drive means for rotating said auger in said one direction, and a feed plate removably mounted on said hopper above said discharge opening and in close overlying relation to said auger, said feed plate extending between said front and rear walls to confine the material advanced by the flights on the auger whereby the auger will force the material down through the discharge opening, said feed plate being spaced from the ends of the hopper and having a length sufficiently greater than the length of the discharge opening to prevent gravity flow of loose material through the discharge opening when the auger is stopped, said front wall having means defining longitudinally spaced lugs thereon, said plate having keepers at the underside adjacent one edge adapted to underlie said lugs, a flange adjacent the other edge of said feed plate, and fasteners extending through said rear wall and engaging said flange to detachably lock said feed plate on the hopper.

8. In combination with a truck, a truck spreader apparatus comprising, a hopper having a discharge opening at the underside thereof, means mounting the hopper on the truck, a broadcast type spreader including a spinner, means mounting said spinner below the hopper for rotation about a generally upright axis offset in a direction parallel to the front-to-rear centerline of the truck to one side of the discharge opening in the hopper whereby material from the hopper is deposited on the spinner substantially at one side of the center thereof, said mounting means for the spinner including selectively adjustable means supporting the spinner for shifting movement of the spinner axis laterally back and forth across the discharge opening in the hopper to permit shifting of the spread pattern of the broadcast spreader in a direction crosswise of the centerline of the truck, and drive means operable to rotate said spinner in all shifted positions thereof.

9. In combination with a dump truck having a dump box mounted thereon for rearward tilting movement about an axis crosswise of the truck, a hopper having a discharge opening at the underside thereof, means mounting the hopper on the dump box for tilting movement as a unit with said box, a broadcast type spreader including a spinner, means mounting the spinner on the hopper for rotation below the hopper about a generally upright axis offset in a direction parallel to the length of the truck to one side of the discharge opening in the hopper whereby material from the hopper is deposited on the spinner substantially at one side of the center thereof, said mounting means for said spinner including selectively adjustable means supporting the spinner on the hopper for swinging movement relative to the hopper about a support axis extending crosswise of the truck and also for shifting movement relative to the hopper in a direction crosswise of the truck at least between a center position in which the axis of the spinner is laterally centered relative to the discharge opening and a position in which the spinner is laterally offset from said center position to one side edge of the discharge opening to enable shifting of the spread pattern in a direction crosswise of the truck, means for maintaining the spinner axis generally upright as the dump box and hopper are tilted while permitting said shifting movement of the spinner in a direction crosswise of the truck, and means for rotating the spinner in all shifted positions thereof.

10. In combination with a dump truck having a dump box mounted thereon for rearward tilting movement about an axis crosswise of the truck, a hopper having a discharge opening at the underside thereof, means mounting the hopper on the dump box for tilting movement as a unit with said box, a broadcast type spreader including a spinner, means mounting the spinner on the hopper for rotation about a generally upright axis offset in a direction parallel to the length of the truck to one side of the discharge opening in the hopper whereby material from the hopper is deposited on the spinner substantially at one side of the center thereof, said mounting means for said spinner including, a rod mounted on said hopper and extending crosswise of the truck, a spinner mounting bracket supported on said rod for vertical swinging movement about the axis of the rod and for sliding movement therealong, to enable shifting of the spread pattern in a direction crosswise of the truck, means connected to said mounting bracket and to the truck for maintaining the spinner generally upright as the dump box and hopper are tilted while permitting sliding movement of the spinner mounting bracket along the rod, means for rotating said spinner, and selectively adjustable means for positioning said mounting bracket in different adjusted positions along the rod.

11. In combination with a truck, a truck spreader apparatus comprising, a hopper having a discharge opening at the underside thereof, means mounting the hopper on the truck, a broadcast-type spreader including a spinner, means mounting said spinner below the hopper for rotation about a generally upright axis offset in a direction parallel to the front-to-rear centerline of the truck to one side of the discharge opening in the hopper whereby material from the hopper is deposited on the spinner substantially at one side of the center thereof, said mounting means for said spinner, including means supporting the spinner for shifting movement relative to the discharge opening in the hopper along a path crosswise of the front-to-rear centerline of the truck at least between a center position in which the axis of the spinner is laterally centered relative to the discharge opening and a position in which the spinner axis is laterally offset from said center position to one side edge of the discharge opening to permit shifting of the spread pattern of the broadcast spreader in a direction crosswise of the centerline of the truck, reversible power operated means operatively connected to said spinner for shifting the same, means including selectively operable remote control means for reversibly actuating said power operated means, and drive means operable to rotate said spinner in all shifted positions thereof.

12. In combination with a dump truck having a dump box mounted thereon for tilting movement about an axis extending crosswise of the front-to-rear centerline of the truck and said dump box having a bottom wall and being open at the rear to permit discharge of material therefrom, a tail gate on the box extending across the rear thereof and having first and second tail gate support means respectively supporting the tail gate for swinging movement about a horizontal axis adjacent the upper edge of the tail gate and for swinging movement about a horizontal axis adjacent the lower edge of the tail gate, the improvement comprising a spreader including an elongated hopper rigidly mounted on the box for tilting movement therewith, said hopper extending crosswise of the truck rearwardly of the dump box and having front and rear walls disposed with the upper edges thereof at a level below said bottom wall of the dump box a distance sufficient to permit said tail gate to swing on said second support means about said horizontal axis adjacent the lower edge of the tail gate to a position substantially level with the bottom wall of the dump box and overlying the top of the hopper for discharge of the material in the box over the top of the hopper, said tail gate being swingable on said first support means about said horizontal axis adjacent the upper edge of the tail gate to a position in which the lower edge of the tail gate is spaced from the rear of the box for discharging the material in the box into the hopper, and means for spreading material from the hopper.

13. In combination with a vehicle, a spreader apparatus comprising, a hopper having a discharge opening at the underside thereof, a broadcast type spreader including a spinner, means mounting said spinner below the hopper for rotation about a generally upright axis offset in a direction parallel to the front-to-rear centerline of the vehicle to the rear side of the discharge opening in the hopper whereby material from the hopper is deposited on the spinner substantially at the front side of the center thereof, said mounting means for the spinner including selectively adjustable means supporting the spinner for shifting movement relative to the discharge opening in the hopper in a direction crosswise of the front-to-rear centerline of the vehicle at least between a center position in which the axis of the spinner is laterally centered relative to the discharge opening and a position in which the spinner axis is laterally offset from said center position to one side edge of the discharge opening to permit shifting of the spread pattern of the broadcast spreader in a direction crosswise of the centerline of the vehicle, and means operable to drive the spinner in all shifted positions thereof.

14. In combination with a dump vehicle having a dump box mounted thereon for tilting movement about an axis extending crosswise of the front-to-rear centerline of the vehicle and said dump box having a bottom wall and being open at the rear to permit discharge of material therefrom, a tail gate on the box extending across the rear thereof and having first and second tail gate support means respectively supporting the tail gate for swinging movement about a horizontal axis adjacent the upper edge of the tail gate and for swinging movement about a horizontal axis adjacent the lower edge of the tail gate, the improvement comprising a spreader including an elongated hopper rigidly mounted on the box for tilting movement therewith, said hopper extending crosswise of the vehicle rearwardly of the dump box and having front and rear walls disposed with the upper edges thereof at a level below said bottom wall of the dump box a distance sufficient to permit said tail gate to swing on said second support means about said horizontal axis adjacent the lower edge of the tail gate to a position substantially level with the bottom wall of the dump box and overlying the top of the hopper for discharge of the material in the box over the top of the hopper, said tail gate being swingable on said first support means about said horizontal axis adjacent the upper edge of the tail gate to a position in which the lower edge of the tail gate is spaced from the rear of the box for discharging the material in the box into the hopper, and means including a pair of feed augers disposed in said hopper in side-by-side relation and each extending closely adjacent the bottom wall for spreading material from the hopper.

15. In combination with a dump vehicle having a dump box mounted thereon for tilting movement about an axis extending crosswise of the front-to-rear centerline of the vehicle and said dump box having a bottom wall and being open at the rear to permit discharge of material therefrom, a tail gate on the box extending across the rear thereof and having first and second tail gate support means respectively supporting the tail gate for swinging movement about a horizontal axis adjacent the upper edge of the tail gate and for swinging movement about a horizontal axis adjacent the lower edge of the tail gate, the improvement comprising a spreader including an elongated hopper rigidly mounted on the box for tilting movement therewith, said hopper extending crosswise of the vehicle rearwardly of the dump box and having front and rear walls disposed with the upper edges thereof at a level below said bottom wall of the dump box a distance sufficient to permit said tail gate to swing on said second support means about said horizontal axis adjacent the lower edge of the tail gate to a position substantially level with the bottom wall of the dump box and overlying the top of the hopper for discharge of the material in the box over the top of the hopper, said tail gate being swingable on said first support means about said horizontal axis adjacent the upper edge of the tail gate to a position in which the lower edge of the tail gate is spaced from the rear of the box for discharging the material in the box into the hopper, a hopper back plate dimensioned to extend lengthwise of the hopper, means removably mounting the back plate on the hopper in a position extending upwardly from the open top of the hopper adjacent the rear wall of the hopper to guide material from the dump box into the hopper, said back plate being movable out of said position at the rear of the hopper to allow the aforedescribed discharged of material over the top of the hopper.

References Cited by the Examiner

UNITED STATES PATENTS

| | | | |
|---|---|---|---|
| 1,166,979 | 1/16 | Gallet | 248—16 |
| 2,022,285 | 11/35 | Hayward | 248—20 |
| 2,099,369 | 11/37 | Lutz | 275—2 |
| 2,296,909 | 9/42 | Dake | 275—2 |
| 2,323,262 | 6/43 | Warren. | |
| 2,687,891 | 8/54 | Puckette | 275—8 |
| 2,805,612 | 9/57 | Beard | 172—111 |
| 2,870,923 | 1/59 | Jewell | 275—8 X |
| 2,940,534 | 8/60 | Chattin | 172—125 X |
| 2,967,056 | 1/61 | D'Amato | 275—8 |
| 2,988,368 | 6/61 | Kerr | 275—6 X |
| 3,019,025 | 1/62 | Young | 275—2 |
| 3,063,723 | 11/62 | Toft | 275—5 |
| 3,158,375 | 11/64 | Vig | 275—8 |

ABRAHAM G. STONE, *Primary Examiner.*

T. GRAHAM CRAVER, WILLIAM A. SMITH III, *Examiners.*